United States Patent
Tajima et al.

(10) Patent No.: US 8,514,819 B2
(45) Date of Patent: Aug. 20, 2013

(54) METHOD FOR CONTROLLING HANDOVER PROCESS BETWEEN MULTIPLE BASE STATIONS

(75) Inventors: Yoshiharu Tajima, Kawasaki (JP); Kazuo Kawabata, Kawasaki (JP); Yoshiaki Ohta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1282 days.

(21) Appl. No.: 12/131,701

(22) Filed: Jun. 2, 2008

(65) Prior Publication Data

US 2008/0232324 A1  Sep. 25, 2008

Related U.S. Application Data

(63) Continuation of application No. PCT/JP2005/023894, filed on Dec. 27, 2005.

(51) Int. Cl.
*H04J 3/00* (2006.01)
*H04W 36/00* (2009.01)

(52) U.S. Cl.
USPC .......................... 370/336; 455/436

(58) Field of Classification Search
USPC .............. 370/331, 332, 333, 338; 455/432.1, 455/433, 435.1, 436, 437, 438, 439, 440, 455/441, 442
See application file for complete search history.

(56) References Cited

U.S. PATENT DOCUMENTS

| 7,020,184 B2 * | 3/2006 | Yuen .............................. 375/152 |
| 7,423,963 B2 * | 9/2008 | Lee ............................... 370/229 |
| 2005/0085251 A1 | 4/2005 | Kaminski et al. |

FOREIGN PATENT DOCUMENTS

| EP | 1 545 143 A1 | 6/2005 |
| JP | 2002-501695 | 1/2002 |
| JP | 2003-047037 | 2/2003 |
| JP | 2004-200838 | 7/2004 |
| JP | 2005-130482 | 5/2005 |
| WO | 98/47302 | 10/1998 |
| WO | 01/30090 | 4/2001 |
| WO | WO 2004-030396 | 4/2004 |

OTHER PUBLICATIONS

3GPP TSG RAN WG3 Meeting #49; Seoul, Korea, Nov. 7-11, 2005; Handling of UEs in LTE_ACTIVE; www.3gpp.org.
3GPP TR 25.913 V7.1.0 (Sep. 2005); 3$^{rd}$ Generation Partnership Project; Technical Specification Group Radio Access Network; Requirements for Evolved UTRA (E-UTRA) and Evolved UTRAN (E-UTRAN); (Release 7).

(Continued)

*Primary Examiner* — Afshawn Towfighi
(74) *Attorney, Agent, or Firm* — Myers Wolin, LLC

(57) ABSTRACT

During handover, an origin base station saves data packets for a mobile station, as well as instructs the mobile station to switch communication to a destination base station, and requests a host station to switch the base station that communicates with that mobile station from the origin base station to the destination base station. After that, when in accordance to the switching request it is possible to save data packets, the host station begins to save the data packets for the mobile station in the place of the origin base station, and after communication between the mobile station and the destination base station has become possible, sends the saved data packets to the mobile station via the destination base station.

10 Claims, 11 Drawing Sheets

(56) References Cited

OTHER PUBLICATIONS

3GPP TR 25.815 V0.3.0 (Sep. 2005); $3^{rd}$ Generation Partnership Project; Technical Specification Group RAN; Signalling enhancements for Circuit-Switched (CS) and Packet-Switched (PS) Connections; Analyses and Recommendations (Release 7).

Japanese Patent Office "Notification of Reasons for Refusal" issued for corresponding Japanese Patent Application No. 2007-551828, dated Dec. 28, 2010. English translation attached.

Qualcomm Europe; "L2 Buffer Management at E-UTRAN Cell Change"; Agenda Item: 6.3.4; 3GPP TSG-RAN WG2 meeting #48bis; R2-052475; Oct. 10-14, 2005.

Siemens AG; "U-plane handling during LTE_ACTIVE Handover"; Agenda Item: Joint 5.2; 3GPP Joint Meeting: SA3, RAN2 & RAN3; R3-060065; Jan. 9-13, 2006.

Extended European search report with the European search opinion issued for corresponding European Patent Application No. 05822372.8 dated Apr. 24, 2012.

* cited by examiner

METHOD FOR CONTROLLING HANDOVER PROCESS BETWEEN MULTIPLE BASE STATIONS

CROSS-REFERENCE TO RELATED APPLICATIONS

This is a continuation application of International Application Number PCT/JP2005/023894, which was filed on Dec. 27, 2005.

The present invention relates to a handover method, and more particularly to a handover control method for a mobile communication system that comprises a plurality of base stations that perform radio communication with a mobile station, and a host station that controls the base stations, and that switches the base station that communicates with that mobile station as the mobile station moves.

BACKGROUND OF THE INVENTION

Currently, third generation CDMA services for mobile communication systems such as mobile telephone systems are beginning to be provided, however, next generation mobile communication methods that will make communication even faster are being studied. In next generation mobile communication, together with increasing the transmission rate, reducing connection delays and transmission delays have become a large challenge.

In mobile communication, when a mobile station that is performing communication moves and the reception conditions becomes poor, the mobile station switches the base station with which it is communicating (handover). During the handover period, the mobile station is not able to receive data, so during that period, it is necessary for the network to save data intended for that mobile station in a buffer. In a conventional communication system, a host mobile control station (host station) saves data for a mobile station in an internal buffer according to a request from the base station with which communication is being performed (origin base station). After that, the host station continues to save data, and after the host station receives a buffer release request from the destination base station, the host station transfers the data for the mobile station that is saved in the buffer to the destination base station, and that destination base station sends that data to the mobile station.

FIG. 11 is a drawing explaining a conventional handover control sequence (refer to the non patent document 1).

A base station BS1 that is performing communication periodically requests a mobile station MS to measure the radio communication status and to send a report. After receiving the request to measure the radio communication status and send a report, the mobile station MS measures the reception levels from the surrounding base stations and sends a report to the base station BS1. The base station BS1 references the reported signal levels, and when it is determined that a handover (HO) is necessary, sets a destination base station.

Next, the origin base station BS1 sends a request to the destination base station BS2 to set the radio communication channel (HO request). When the origin base station BS1 receives a radio communication setting response in response to this HO request (HO confirmation), the origin base station BS1 requests the host station MCS to switch the communication base station from the origin base station BS1 to the destination base station BS2, and at the same time requests that the host station save data that is intended for the mobile station (buffer request). When there is space in the buffer and it is possible to switch from the origin base station BS1 to the destination base station BS2, the host station MCS saves the data for the mobile station in the buffer, and sends a switch OK signal to the origin base station BS1 (buffer confirmation OK). On the other hand, when there is no space in the buffer and it is not possible to switch from the origin base station BS1 to the destination base station BS2, the host station MCS does not send the buffer confirmation OK until switching becomes possible.

After there is a buffer confirmation response, the origin base station BS1 sends a request (HO instruction) to the mobile station MS to switch the communication base station from the origin base station BS1 to the destination base station BS2. The mobile station MS executes control according to this HO instruction to switch the communication base station from the origin base station BS1 to the destination base station BS2, and after switching is complete, sends a handover response (HO response) to the destination base station BS2. After receiving the HO response, the destination base station BS2 sends a buffer release request to the host station MCS. After receiving the buffer release request, the host station MCS transfers the data for the mobile station that is saved in the buffer to the destination base station BS2, and the destination base station BS2 sends that data to the mobile station. After that, the host station MCS sends data that is intended for the mobile station and received over a wired network such as an IP network to the destination base station BS2.

In the conventional handover control described above, the origin base station BS1 is able to send a handover instruction to the mobile station for the first time after a buffer confirmation response is returned from the host station MCS. In other words, the origin base station BS1 is not able to send a handover instruction to the mobile station until a switching OK (buffer confirmation OK) response is returned from the host station.

As was described above, when there is a buffer request from the origin base station BS1 to the host station MCS, the host station MCS does not respond with a buffer confirmation OK when it is not possible to switch from the origin base station BS1 to the destination base station BS2. Therefore, sending the handover instruction to the mobile station is delayed until switching becomes possible, so there is a problem in that the delay during handover becomes large.

SUMMARY OF THE INVENTION

Taking the aforementioned problem into consideration, the object of the present invention is to provide a handover control method that is capable of sending a handover instruction to the mobile station even though there is no buffer confirmation response from the host station.

Another object of the present invention is to provide a handover control method that is capable of reducing the delay during handover.

Non Patent Document 1: 3GPP TSG RAN WG3 Meeting #49 Seoul, Korea, 7-11 Nov. 2005, R2-052917

The present invention is a handover control method for a mobile communication system having a plurality of bases stations that communicate by way of radio communication with a mobile station, and a host station that controls the base stations, and that switches the base station that communicates with the mobile station as the mobile station moves.

First Handover Control Method

A first handover control method of this invention comprises: a first step of saving data packets for the mobile station during handover by an origin base station that has communicated with the mobile station up to that time; a second step of saving data packets for the mobile station by the host station; and a third step of sending the saved data packets to the mobile station via a destination base station when communication between the mobile station and that destination base station becomes possible.

In the first step, the origin base station saves the data packets, as well as instructs the mobile station to switch communication to the destination base station, and requests the host station to switch the base station that communicates with the mobile station from the origin base station to the destination base station; and in the second step the host station begins saving the data packets in accordance to the switching request when it is possible to save the data packets.

This first handover control method of the invention further comprises: a step in which the origin base station transfers the data packets that have been saved up to that time to the host station after determining that the host station can save data packets; and a step in which the host station saves data packets for the mobile station, as well as saves data packets that are received from the origin base station; and where in the third step the host station sends the saved data packets to the mobile station via the destination base station when communication between the mobile station and the destination base station becomes possible.

The first handover control method of the invention further comprises a step in which the origin base station continues to save data packets for the mobile station when it is not possible for the host station to save the data packets; and a step in which the origin base station sends the saved data packets to the mobile station via the destination base station when communication between the mobile station and the destination base station becomes possible.

Second Handover Control Method

A second handover control method of the present invention, comprises: a first step of saving data packets for the mobile station during handover by a destination base station to which the mobile station will be handed over; a second step of saving data packets for the mobile station by the host station; and a third step of sending the saved data packets to the mobile station by way of the destination base station when communication between the mobile station and that destination base station becomes possible.

In the first step, the origin base station that communicated with the mobile station up until this time transfers data packets for the mobile station to the handover destination base station; and the destination base station saves those data packets.

In the first step, the origin base station transfers data packets for the mobile station to the destination base station, as well as instructs the mobile station to switch communication to the destination base station, and requests the host station to switch the base station that communicates with the mobile station from the origin base station to the destination base station; and the host station begins saving data packets in accordance to the switching request when it is possible to save the data packets.

In the first step, the origin base station stops transferring data packets to the destination base station after it determines that the host station can save the data packets; and in the third step, when communication between the mobile station and the destination base station becomes possible, the destination base station sends the saved data packets to the mobile station, and the host station sends the saved data packets to the mobile station via the destination base station.

The second handover control method of the present invention further comprises: a step in which the origin base station continues transferring data packets to the destination base station when it is not possible for the host station to save the data packets; and the destination base station saves the transferred data packets; and in the third step, when communication between the mobile station and the destination base station becomes possible, the destination base station sends the saved data packets to the mobile station.

DESCRIPTION OF THE PREFERRED EMBODIMENTS (A) Embodiment 1

(a) Construction of a Mobile Communication System

Figure 1:
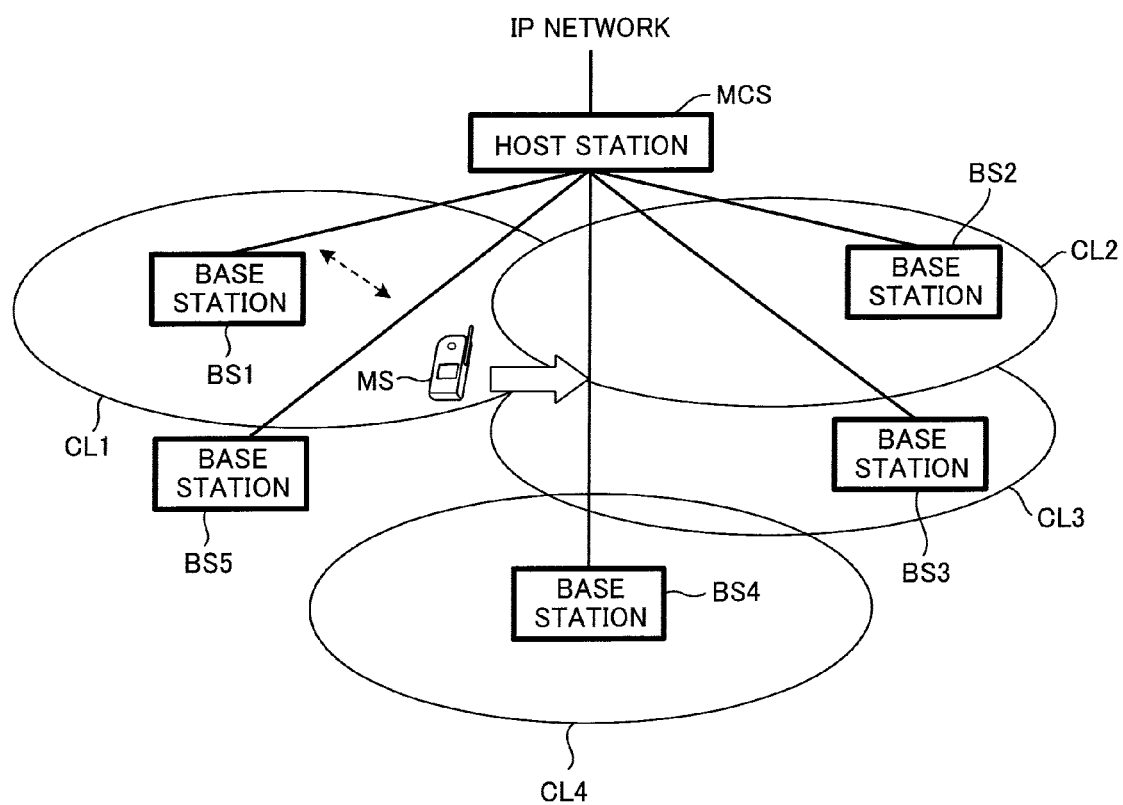
FIG. 1 is a drawing showing the construction of a mobile communication system to which the present invention can be applied.

FIG. 1 is a drawing that shows the construction of a mobile communication system to which the present invention can be applied, and comprises: a mobile control station (host station) MCS that controls base stations that are under it: base stations BS1 to BSn and a plurality of mobile stations (only one mobile station is shown). The host station is connected to an IP network, which is a wired network, and is also connected to the plurality of base stations BS1 to BSn of which it controls; and the base stations BS1 to BSn perform radio communication with the mobile stations MS that are located within the cells CL1 to CLn.

A packet that is sent to a mobile station MS from a terminal (not shown in the figure) passes over the IP network and is sent to the host computer MCS that accommodates that mobile station MC. When the mobile station MS is located within the cell CL1, the host station MCS sends that packet to the base station BS1 that accommodates that cell CL1, and the base station BS1 sends that packet to the mobile station MS by radio communication. After that, as long as the mobile station MS is located within the cell CL1, the host station MCS performs control so that the mobile station MS and the terminal can communicate with each other over the path described above. However, when the mobile station MS moves in the direction toward the adjacent cell CL2 and the reception status becomes poor, the base station BS1 or the host station MCS performs handover control and sets a destination base station, after which the host station MCS sends packets to the mobile station MS by way of that destination base station (base station BS2).

(b) Handover Control Sequence

Figure 2:
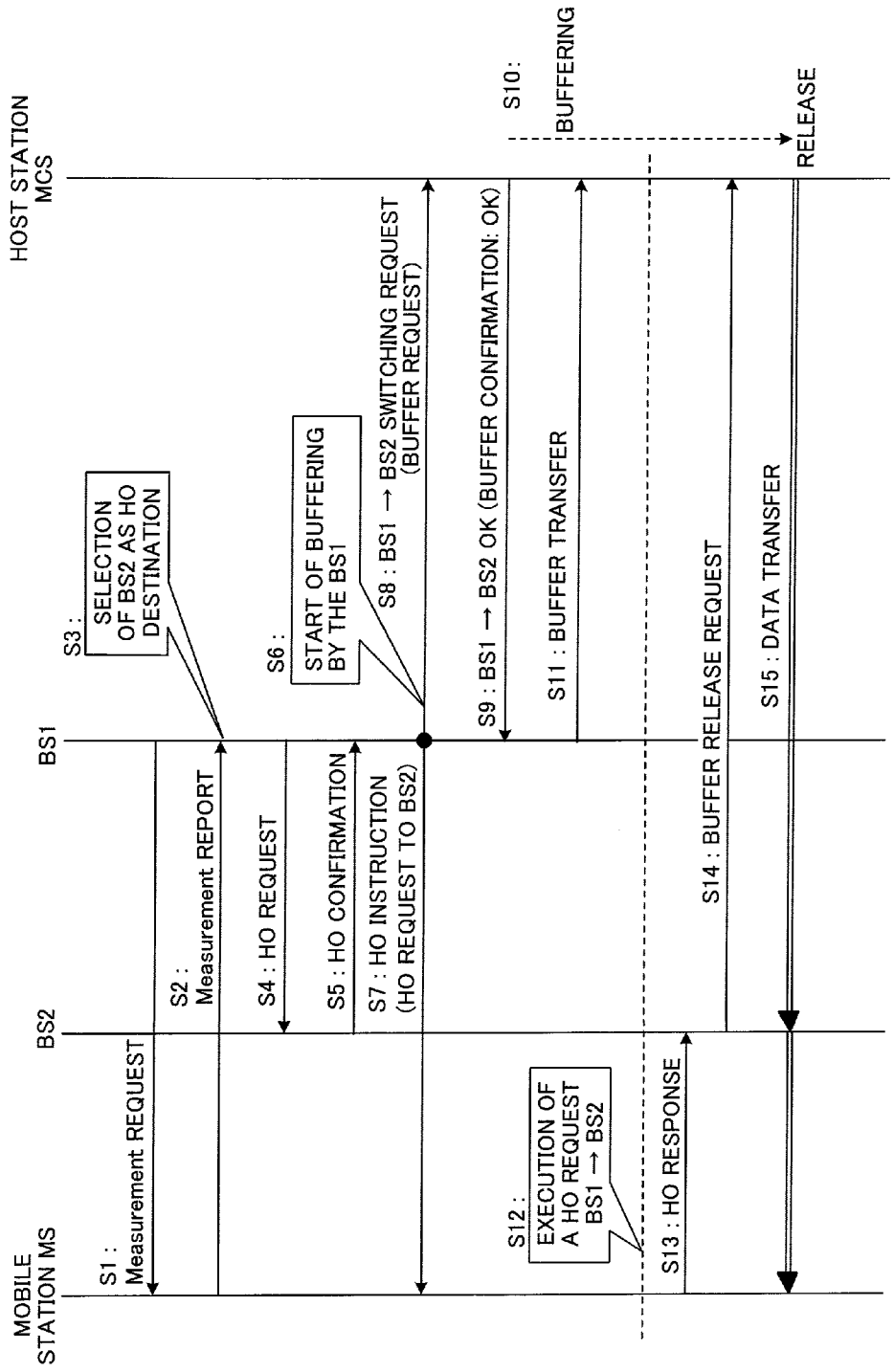
FIG. 2 shows the handover control sequence (buffer confirmation OK) of the present invention.
Figure 3:
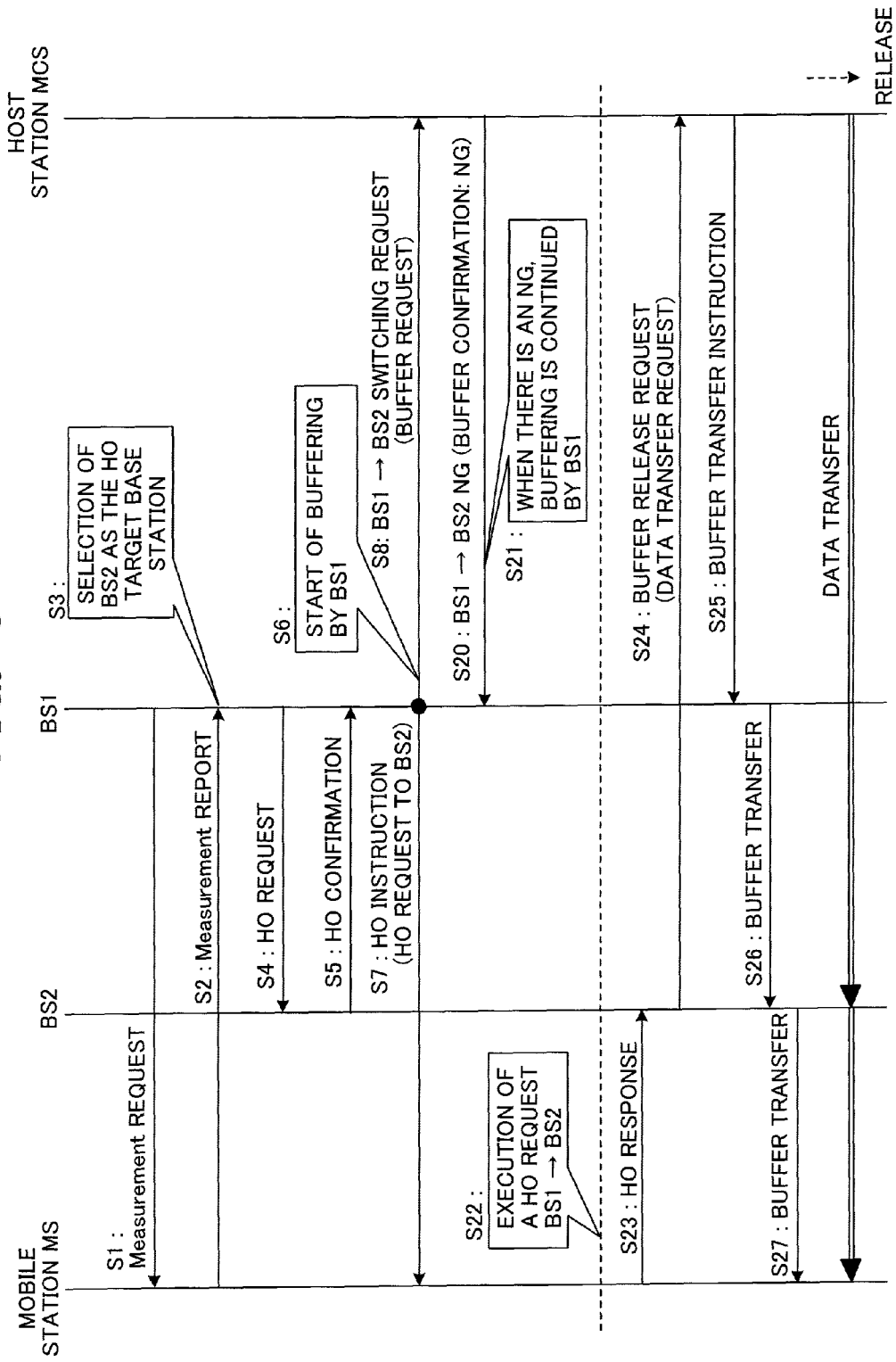
FIG. 3 shows the handover control sequence (buffer confirmation NG) of the present invention.

FIG. 2 and FIG. 3 show the handover control sequence of the present invention, and show the case in which handover control is performed by the base station (origin base station) that is communicating with the mobile station MS. FIG. 2 shows the handover control sequence for the case in which there is a buffer confirmation OK response, and FIG. 3 shows the handover control sequence for the case in which there is a buffer confirmation NG (NO GOOD) response. Handover control could also be performed by the host station MCS.

Buffer Confirmation OK

In FIG. 2, the base station BS1 that is in the progress of performing communication with the mobile station MS sends a request to the mobile station MS to periodically measure and report the radio communication status (step S1). After receiving the request to measure and report the radio communication status, the mobile station MS measures the reception levels from the surrounding base stations and reports the results to the base station BS1 (step S2). The base station BS1 references the reported signal levels, and when handover is necessary, sets a designation base station (step S3). It is also possible for the mobiles station to set the destination base station.

Next, the origin base station BS1 sends a request to the destination base station BS2 to set a radio communication channel (HO request, step S4). In response to the HO request, the destination base station BS2 sets the radio communication channel, and sends a response to the origin base station BS1 that the radio communication channel has been set (HO confirmation, step S5).

After receiving the HO confirmation, the origin base station BS1 starts saving data packets that are intended for the mobile station in an internal buffer (step S6, and at the same time, instructs the mobile station MS to switch communication to the destination base station BS2 (HO instruction, step S7), as well as requests the host station MCS to switch the communication base station from the origin base station BS1 to the destination base station BS2, and requests that the host station MCS save data that is intended the mobile station (buffer request, step S8).

In response to the buffer request, when there is space in the buffer and it is possible to switch from the origin base station BS1 to the destination base station BS2, the host station MCS sends a confirmation to the origin base station BS1 indicating that switching is possible (buffer confirmation OK, step S9), and begins saving packets for the mobile station in the buffer (step S10).

After receiving the buffer confirmation OK, the origin base station BS1 becomes aware that the host station can save data packets and transfers the packets for the mobile station that were saved up until then in its internal buffer to the host station MCS, and the host station MCS saves the packets that are transferred from the origin base station BS1 together with the aforementioned data packets for the mobile station (step S11).

On the other hand, in accordance to a HO instruction, the mobile station MS executes control to switch the communication base station from the origin base station BS1 to the destination base station BS2 (step S12), and after switching is complete, sends a handover response (HO response) to the destination base station BS2 (step S13).

After receiving the HO response, the destination base station BS2 sends a buffer release request to the host station MCS (step S14). The host station MCS receives the buffer release request and then transfers the data for the mobile station MS that was saved in the buffer to the destination base station BS2, and the destination base station BS2 sends that data to the mobile station MS. After that, the host station MCS sends packets for the mobile station MS that are received from the wired network to the mobile station MS via the destination base station BS2 (step S15).

Buffer Confirmation NG

The sequence for the case in which in there is a response from the host station MSC to the buffer request that it is possible to switch the base station (buffer confirmation OK) was described above. When there is a response from the host station MSC to the buffer request that it is not possible to switch the base station (buffer confirmation NG), control is performed according to the sequence shown in FIG. 3. In the sequence shown in FIG. 3, steps S1 to S8 are the same as in the sequence shown in FIG. 2.

When handover is found to be necessary based on the level of reception signals, the origin base station BS1 sets the destination base station (steps S1 to S3). Next, the origin base station BS1 requests the destination base station BS2 to set a radio communication channel (HO request, step S4). In response to the HO request, the destination base station BS2 sets a radio communication channel, and after the radio communication channel has been set, sends a response to the origin base station BS1 (HO confirmation, step S5).

After receiving the HO confirmation, the origin base station BS1 starts saving data packets sent to the mobile station in an internal buffer (step S6), and at the same time instructs the mobile station MS to switch communication to the destination base station BS2 (HO instruction, step S7), as well as sends a request to the host station MCS to switch the communication base station from the origin base station BS1 to the destination base station BS2, and requests that the host station MCS save data for the mobile station MS (buffer request, step S8).

When there is no space in the buffer and it is not possible to switch from the origin base station BS1 to the destination base station BS2, then in response to the buffer request, the host MCS notifies the origin base station BS1 that switching is not possible (buffer confirmation NG, step S20). Due to the buffer confirmation NG, the origin base station BS1 continues to save data packets that are intended for the mobile station MS (step S21).

On the other hand, in accordance to the HO instruction, the mobile station MS executes control to switch the communication base station from the origin base station BS1 to the destination base station BS2 (step S22), and after switching is complete, sends a handover response to the destination base station BS2 (HO response, step S23).

After receiving the HO response, the destination base station BS2 sends a buffer release request to the host station MCS (step S24). The host station MCS receives the buffer release request and then sends an instruction to the origin base station BS1 to transfer the contents of the buffer (step S25). Following that buffer transfer instruction, the origin base station BS1 transfers the packets for the mobile station MS that are saved in its internal buffer to the destination base station BS2 (step S26), and the destination base station BS2 sends those packets to the mobile station MS (step S27). After that, the host station MCS sends packets for the mobile station MS that are received from the wired network to the mobile station MS via the destination base station BS2 (step S28).

(c) Construction of the Origin Base Station

Figure 4:
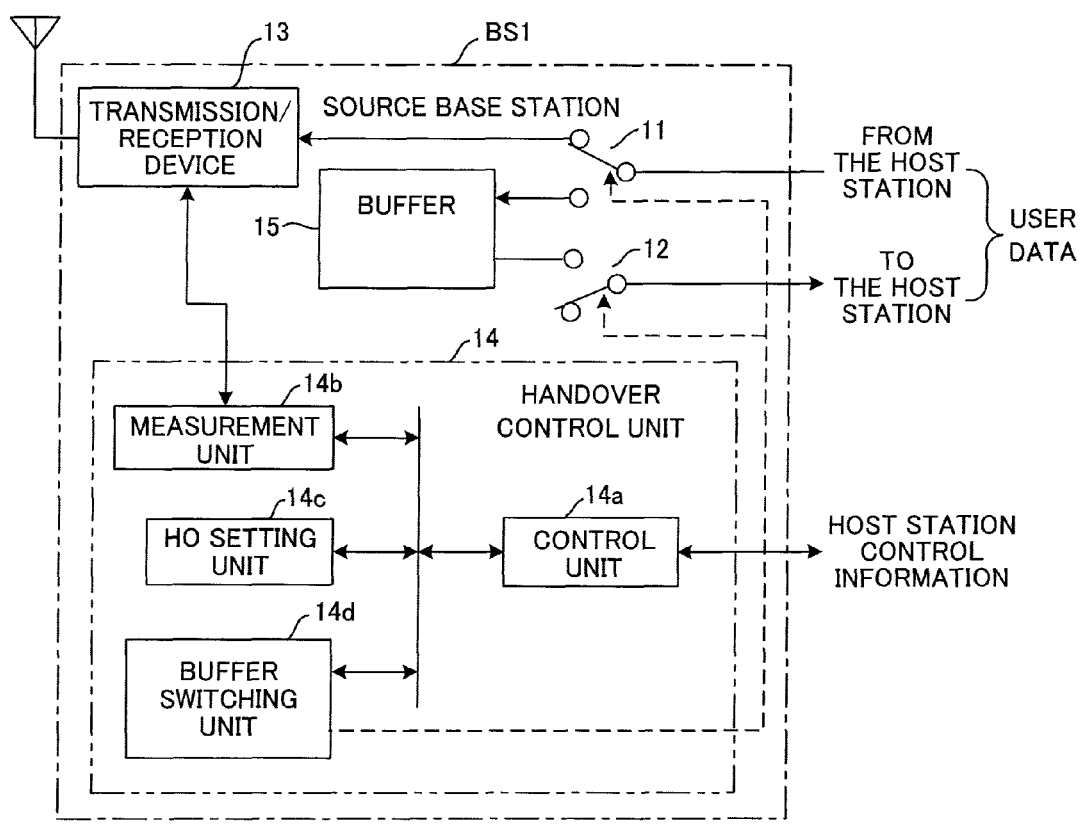
FIG. 4 is a drawing showing the construction of the parts of the origin base station BS1 that are related to handover.

FIG. 4 is a drawing showing the construction of the parts of the origin base station BS1 that are related to the handover.

When not in the handover state, a first switch and a second switch 11, 12 are in the states shown in the figure, and the origin base station BS1 sends packets for the mobile station MS that are received from the host station MCS to the mobile station MS via a transmission/reception unit 13 using radio communication.

A control unit 14a of a handover control unit 14 executes handover control according to the sequences shown in FIG. 2 and FIG. 3. In response to control from the control unit 14a, a measurement unit 14b sends control data to the mobile station to periodically measure and report the radio communication status of the surrounding base stations (step S1), and inputs the reception levels of the surrounding base stations received from the mobile station to a handover setting unit 14c. The handover setting unit 14c references the reported signal levels and determines whether handover is necessary, and when handover is necessary, sets a destination base station (steps S2 to S3).

After the destination base station has been set, the control unit 14a executes handover control according to steps S4 to S8 shown in FIG. 2. A buffer switching unit 14d follows an instruction from the control unit 14a in step S6 and switches the first switch 11 to the input side of a buffer 15, and saves data for the mobile station in that buffer.

Moreover, when there is a buffer confirmation OK (step S9), the buffer switching unit 14d returns the first switch 11 to the state shown in the figure according to an instruction from the control unit 14a, as well as switches the second switch 12 to the output side of the buffer 15 and sends the packets for the mobile station that were saved in that buffer 15 to the host station MCS (step S11).

However, when there is a buffer confirmation NG (step S20), the switching unit 14d keeps the first switch 11 switched to the input side of the buffer 15, and packets for the mobile station continue to be saved in the buffer 15. In step S25, when there is a buffer transfer instruction from the control unit 14a, the switching unit 14d switches the second switch 12 to the output side of the buffer 15 and sends the packets that were saved in that buffer 15 to the destination base station BS2 via the host station MCS.

(d) Construction of the Host Station

Figure 5:
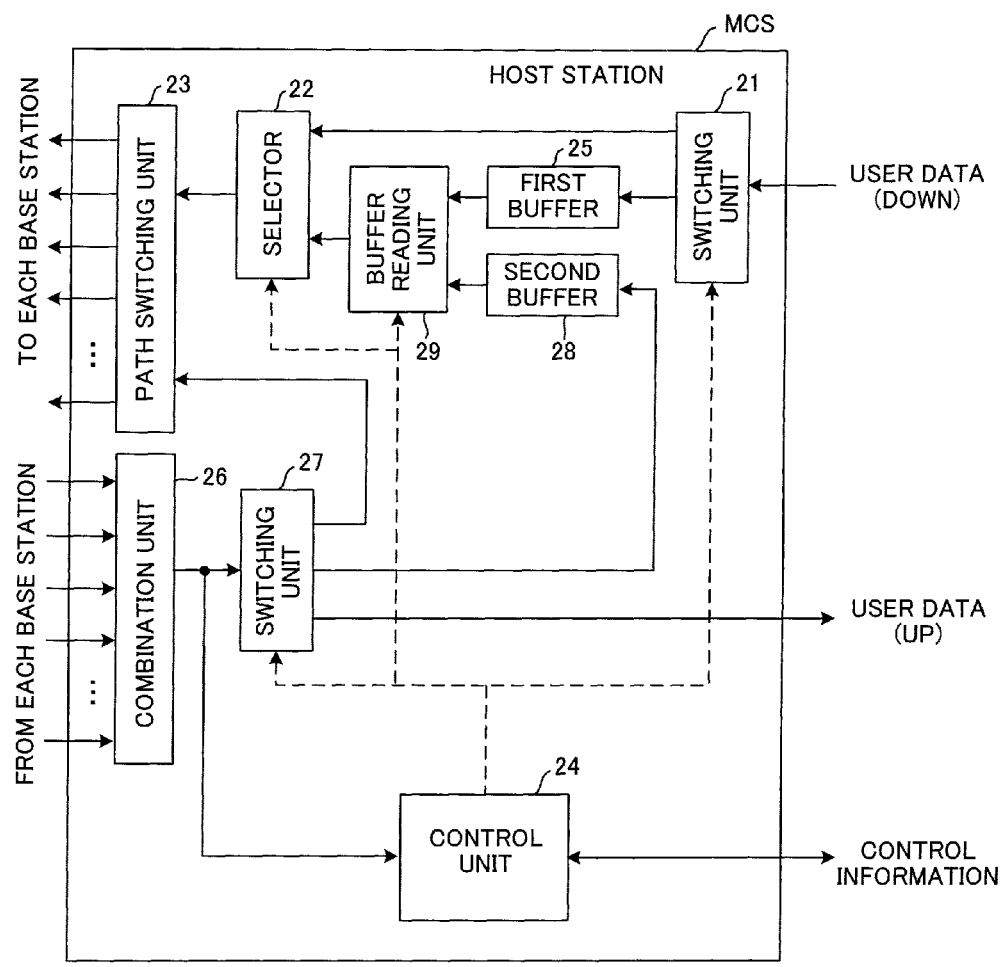
FIG. 5 is a drawing showing the construction of the parts of the host station MCS that are related to handover.

FIG. 5 is a drawing showing the construction of the parts of the host station MCS that are related to handover control. When not in the handover state, a switching unit 21 sends packets that arrive for the mobile station over a wired network to the base station BS1 via a selector 22 and a path switching unit 23, and that base station sends the received packets to the mobile station. Also, the packets from the base station BS1 are sent to the wired network via a combination unit 26 and switching unit 27.

During handover, when there is a buffer request from the origin base station BS1 (step S8), a control unit 24 determines whether there is space in a buffer and whether it is possible to switch the base station, and when it is possible to switch the base station, returns a buffer confirmation OK response to the origin base station BS1 (step S9), as welt as controls the switching unit 21 to save packets for the mobile station in a first buffer 25 (step S10). Moreover, in accordance to the buffer confirmation OK response, when packets are sent from the origin base station BS1 (step S11), the control unit 24 controls the switching unit 27 and saves the packets in a second buffer 28. By doing this, all of the packets after handover are saved in the first and second buffers 25, 28.

After handover of the mobile station has been completed and a buffer release request has been generated from the destination base station BS2 (step S14), the control unit 24 controls a buffer reading unit 29 to read and combine the saved packets in order from the second buffer 28 and then the first buffer 25, and sends the packets to the destination base station BS2 via the selector 22 and path switching unit 23 (step S15). After that, the control unit 24 controls the switching unit 21, selector 22 and path switching unit 23 to send the packets for the mobile station that arrive from the wired network to the destination base station BS2.

The description above is for the case when there is a buffer confirmation OK response, however, in the case when there is a buffer confirmation NG response (step S20), the control unit 24 controls the switching unit 21, selector 22 and path switching unit 23 to send packets to the origin base station BS1 without saving them.

After that, when the handover of the mobile station MS has been completed and a buffer release request is generated from the destination base station BS2 (step S24), the control unit 24 instructs the origin base station BS1 to transfer the contents of the buffer (step S25). By doing this, the origin base station BS1 sends the packets stored in the buffer 15 to the destination base station BS2 via the host station MCS (step S26). When doing this, the control unit 24 of the host station MCS controls the combination unit 26, switching unit 27 and path switching unit 23 to send packets arriving from the origin base station BS1 to the destination base station BS2 (step S26). After that, the control unit 24 controls the switching unit 21, selector 22 and path switching unit 23 to send packets for the mobile station that arrive from the IP network to the destination base station BS2.

(e) Flow of Handover Control by the Origin Base Station

Figure 6:
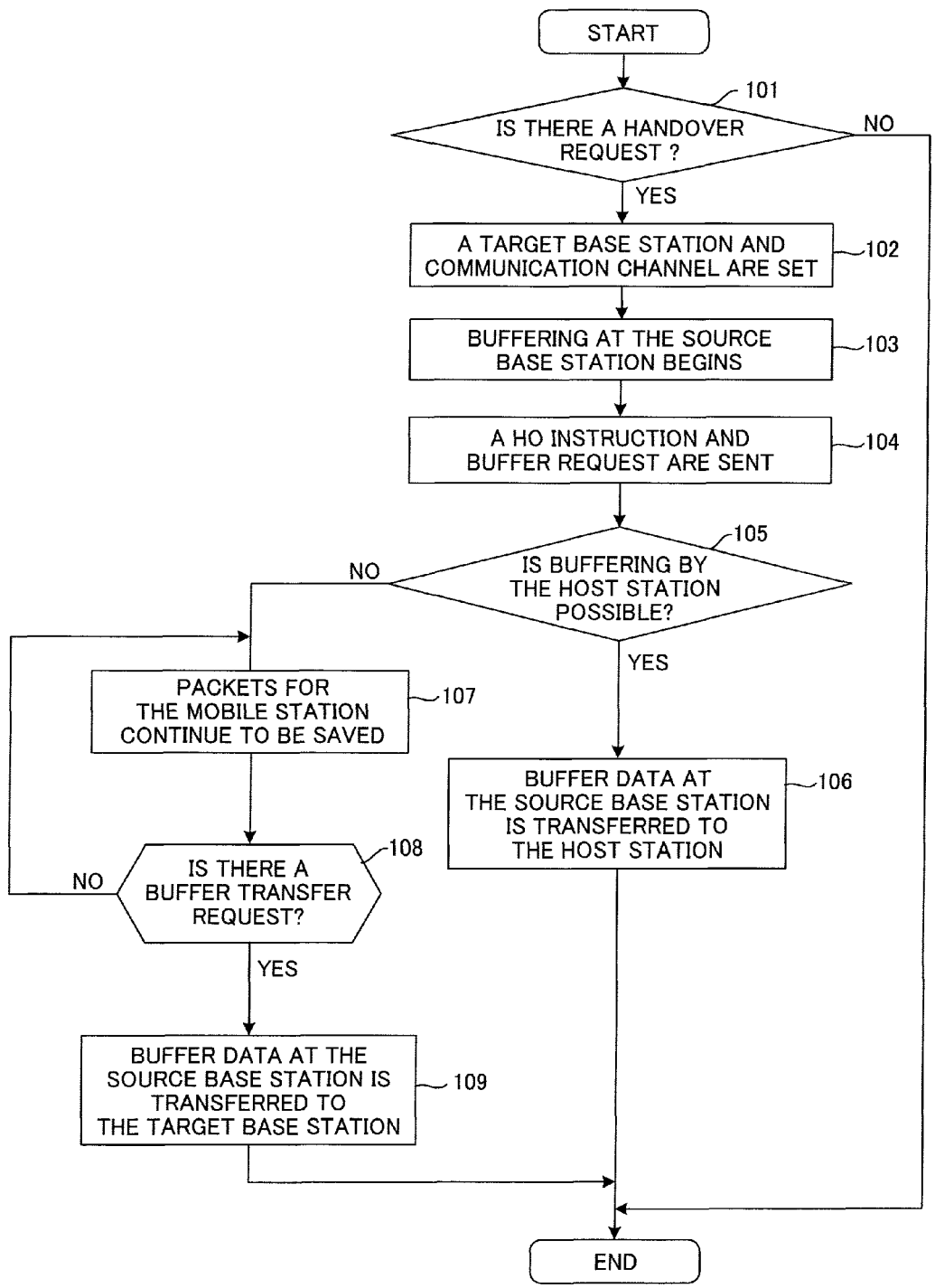
FIG. 6 is a flowchart showing the processing flow during handover control by the origin base station BS1.

FIG. 6 is a flowchart showing the processing during handover control by the origin base station BS1.

The origin base station BS1 references the signal levels from the base stations surrounding the mobile station, and checks whether a handover is necessary (step 101), and when a handover is not necessary, ends processing and waits until the next judgment. On the other hand, when handover control is necessary, the origin base station BS1 references the reception signal levels from the surrounding base stations, then sets a handover destination base station and sets the communication channel to that destination base station BS2 (step 102). After setting the communication channel, the origin base station BS1 saves packets for the mobile station (step 103) as well as instructs the mobile station to execute the handover and sends a switching request (buffer request) to the host station MCS to switch the communication base station (step 104).

When it is possible for the host station MCS to save the packets for the mobile station, or in other words, when it is possible to switch the communicating base station, the origin base station BS1 sends the saved packets for the mobile station to the host station MCS from step 103 until there is a 'YES' in step 105 (step 106).

On the other hand, in step 105, when the host station MCS is not able to save packets for the mobile station, the origin base station continues to save the packets for the mobile station (step 107), and waits for an instruction from the host station to transfer the contents of the buffer (step 108). When there is an instruction from the host station to transfer the contents of the buffer, the origin base station BS1 transfers the packets for the mobile station that are saved in the buffer to the destination base station BS2 (step 109).

With the first embodiment described above, during handover, data packets that are for the mobile station are first saved by the handover origin base station, and then after that the data packets for the mobile station are saved by the host station, so even when there is no buffer confirmation response from the host station, data packets for the mobile station continue to be saved by the handover origin base station, and when the mobile station becomes able to communicate with the destination base station, the saved data can then be sent to the mobile station, so it is possible to reduced the handover delay when there is no buffer confirmation response from the host station.

(B) Second Embodiment (a) Handover Control Sequence

A second embodiment of the invention differs from the first embodiment in that during handover, data packets for the mobile station are first saved by the destination base station to which the mobile station is handed over, and then after that the data packets for the mobile station are saved by the host station.

Figure 7:
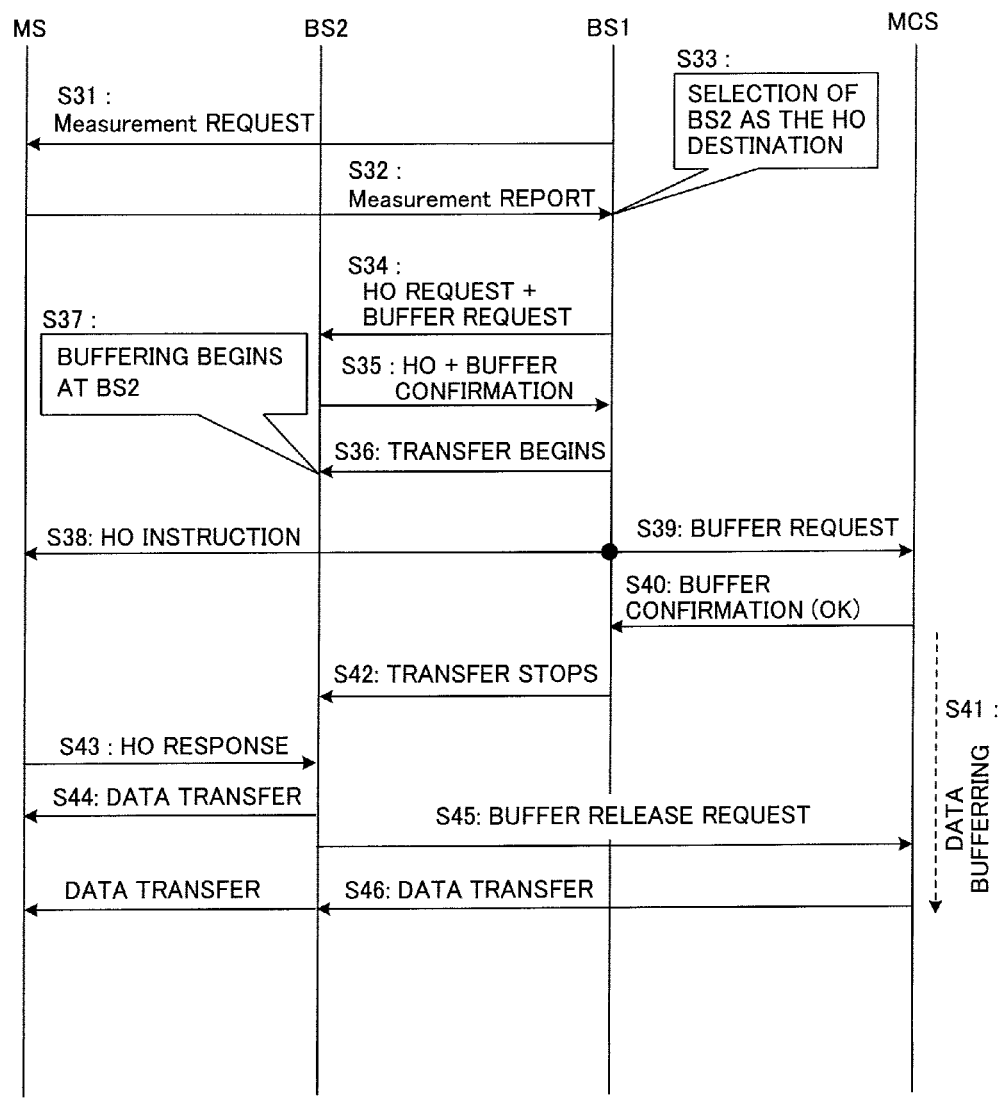
FIG. 7 shows the handover control sequence (buffer confirmation OK) of a second embodiment of the present invention.
Figure 8:
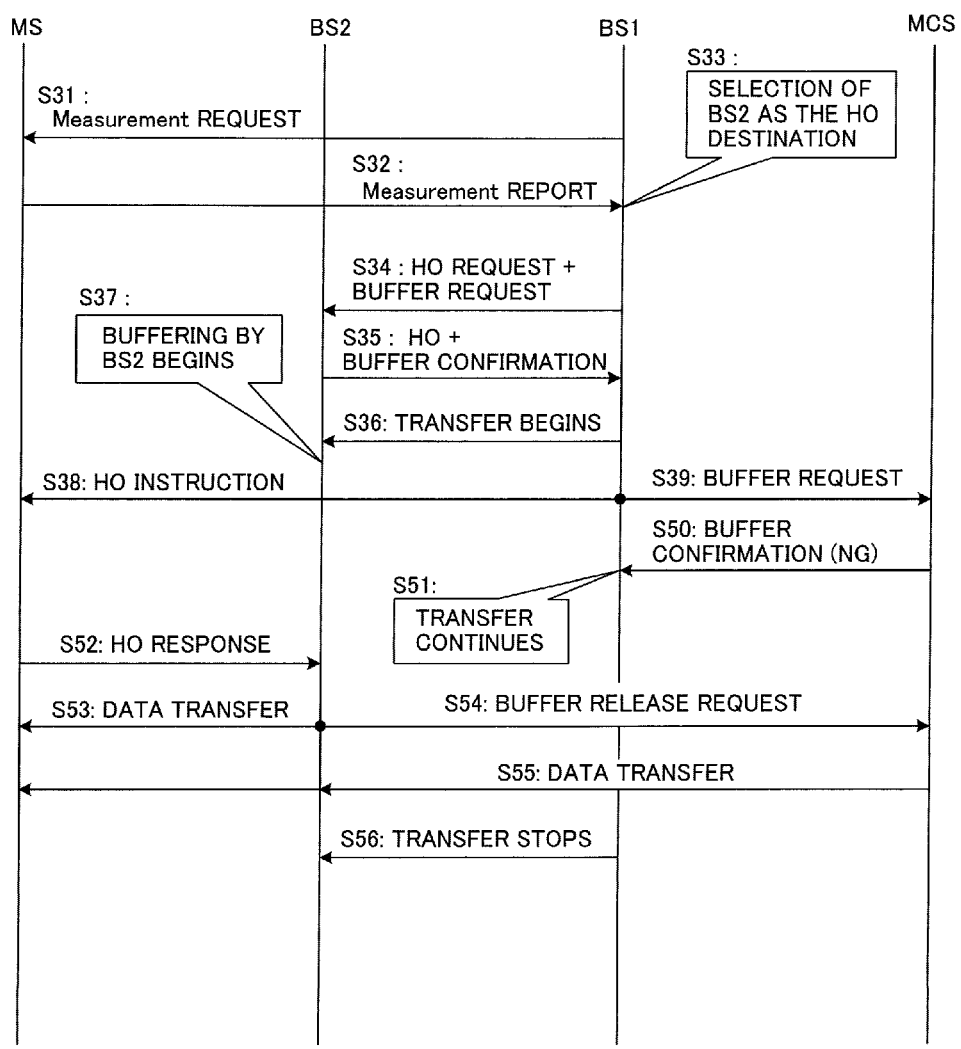
FIG. 8 shows the handover control sequence (buffer confirmation NG) of a second embodiment of the present invention.

FIG. 7 shows the case of the handover control sequence of the second embodiment of the invention for when the communicating base station (origin base station) performs handover control. FIG. 7 shows the handover control sequence when there is a buffer confirmation OK response, and FIG. 8 shows the handover control sequence when there is a buffer confirmation NG response. Handover control can also be performed by the host station.

Handover Confirmation OK

In FIG. 7, the communicating base station BS1 sends a request to the mobile station MS to periodically measure and report the radio communication status (step S31). After receiving the request to measure and report the radio communication status, the mobile station MS measures the reception levels of the surrounding base stations and reports the result to the base station BS1 (step S32). The base station BS1 references the reported signal levels, and when handover is necessary, sets a destination base station (step S33). It is also possible for the mobile station to set the destination base station.

Next, the origin base station BS1 sends a request to the destination base station BS2 to set a radio communication channel, and requests that the destination base station BS2 save packets for the mobile station (HO request and buffer request, step S34). In accordance to the HO request and buffer request, the destination base station BS2 sets a radio communication channel, and when it is possible to save packets for the mobile station in a buffer, returns a response indicating that a radio communication channel has been set together with a buffer OK confirmation to the origin base station BS1 (HO confirmation and buffer confirmation, step S35).

After receiving the HO confirmation and buffer confirmation, the origin base station BS1 begins transferring data packets to the destination base station BS2 (step S36). The destination base station BS2 saves the data packets in an internal buffer (step S37). At the same time, the destination base station BS1 sends an instruction to the mobile station to switch communication to the destination base station BS2 (HO instruction, step S38), as well as sends a request to the host station MCS to switch the communicating base station from the origin base station BS1 to the destination base station BS2, and requests that the host station MCS save data for the mobile station (buffer request, step S39).

In response to the buffer request, when there is space in a buffer, and when it is possible to switch the communication base station from the origin base station BS1 to the destination base station BS2, the host station MCS sends a switching possible response to the origin base station BS1 (buffer confirmation OK, step S40), and begins saving packets for the mobile station in a buffer (step S41).

After receiving the buffer confirmation OK response, the origin base station BS1 becomes aware that the host station is capable of saving data packets, and stops transferring packets for the mobile station to the destination base station BS2 (step S42). By doing this, packets for the mobile station that were generated during the period from step S36 until the buffer confirmation OK response is output in step S40 are saved in the buffer of the destination base station BS2, and after that, the packets for the mobile station are saved by the host station MCS.

On the other hand, in accordance to the HO instruction, the mobile station MS executes control to switch the communication base station from the origin base station BS1 to the destination base station BS2, and after switching is complete, sends a handover response (HO response) to the destination base station BS2 (step S43).

After receiving the HO response, the destination base station BS2 sends the packets for the mobile station that are saved in the internal buffer to the mobile station (step S44), and sends a buffer release request to the host MCS (step S45). The host MCS receives the buffer release request and then transfers the data for the mobile station that is saved in the buffer to the destination base station BS2 (step S46), and the destination base station BS2 sends that data to the mobile station. After that, the host station MCS sends data for the mobile station that is received from the wired network to the mobile station via the destination base station BS2 (step S46).

Buffer Confirmation NG

The sequence for the case in which there is a response from the host station MCS to the buffer request that switching the base station is possible (buffer confirmation OK) was described above. When there is a response from the host station MCS to the buffer request that switching the base station is not possible (buffer confirmation NG), control is performed according to the sequence shown in FIG. 8. In the sequence shown in FIG. 8, steps S31 to S39 are the same as in the sequence shown in FIG. 7.

When a handover is found to be necessary based on the reception signal levels, the origin base station BS3 sets a destination base station (steps S31 to S33). Next, the origin base station BS1 sends a request to the destination base station BS2 to set a radio communication channel and requests the destination base station BS2 to save packets for the mobile station (HO request and buffer request, step S34). In response to the HO request and buffer request, the destination base station BS2 sets a radio communication channel, and when it is possible to save packets for the mobile station, returns a response indicating that the radio communication channel has been set and returns a buffer OK confirmation response to the origin base station (HO confirmation and buffer confirmation, step S35).

After receiving the HO confirmation and buffer confirmation, the origin base station BS1 begins transferring data packets to the destination base station BS2 (step S36), and the destination base station BS2 saves the data packets in an internal buffer (step S37). At the same time as this, the origin base station BS1 sends an instruction to the mobile station to switch communication to the destination base station BS2 (HO instruction, step S38), as well as sends a request to the host station MCS to switch the communication base station from the origin base station BS1 to the destination base station BS2, and requests the host station MCS to save data for the mobile station (buffer request, step S39).

When in response to the buffer request, there is no space in a buffer and it is not possible to switch the communicating base station, the host station MCS sends a response to the origin base station BS1 indicating that switching is not possible (buffer confirmation NG, step S50). In accordance to that buffer confirmation NG, the origin base station BS1 continues to transfer packets for the mobile station to the destination base station BS2, and the destination base station BS2 saves the packets that are sent (step S51).

On the other hand, in accordance to the HO instruction, the mobile station MS executes control to switch the communication base station from the origin base station BS1 to the destination base station BS2, and after switching is complete, sends a handover response to the destination base station BS2 (HO response, step S52).

After receiving the HO response, the destination base station BS2 sends the packets that are saved in the internal buffer to the mobile station (step S53), and sends a buffer release request to the host station MCS (step S54). After receiving the buffer release request, the host station MCS sends data for the mobile station that is received from the wired network to the mobile station via the destination base station BS2 (step S55). After that, the origin base station BS1 ends the transfer of data to the destination base station BS2 (step S56).

(b) Destination Base Station

Figure 9:
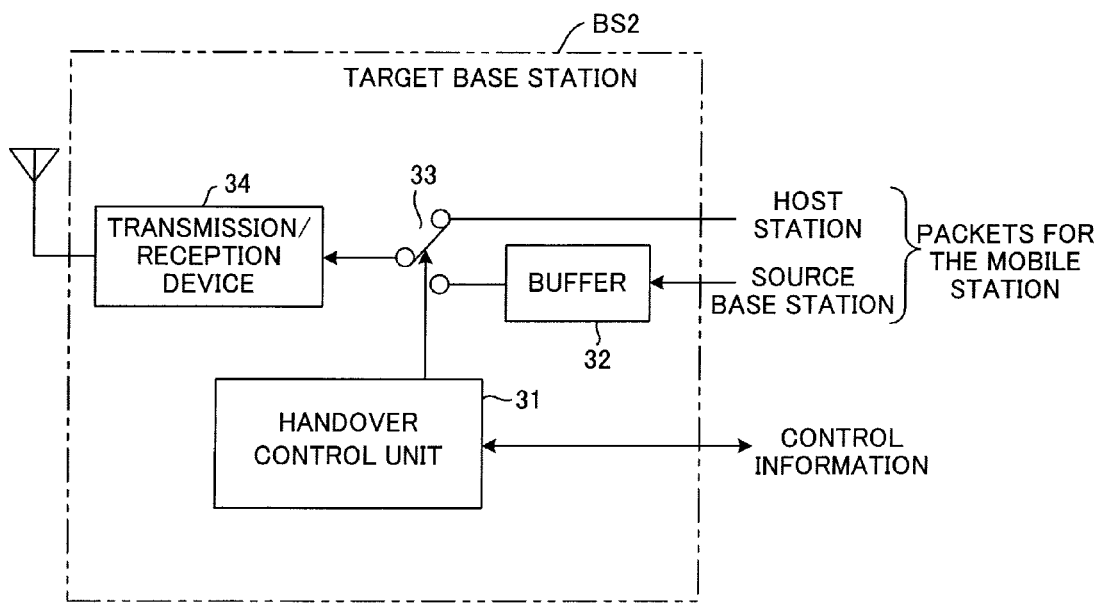
FIG. 9 is a drawing showing the construction of the parts of the destination base station that are related to handover.

FIG. 9 shows the construction of the parts of the destination base station that are related to a handover. A handover control unit 31 executes handover control according to the sequences shown in FIG. 7 and FIG. 8. Moreover, when the origin base station BS1 begins transferring packets for the mobile station in step S36, the handover control unit 31 saves those packets in a buffer 32. After that, when a HO response is received from the mobile station MS, the handover control unit 31 switches a switch 33 to the output side of the buffer 32, and then inputs the packets for the mobile station that are saved in the buffer 32 to a transmission/reception unit 34 and sends the packets to the mobile station MS.

(c) Flow of Handover Control by the Origin Base Station

Figure 10:
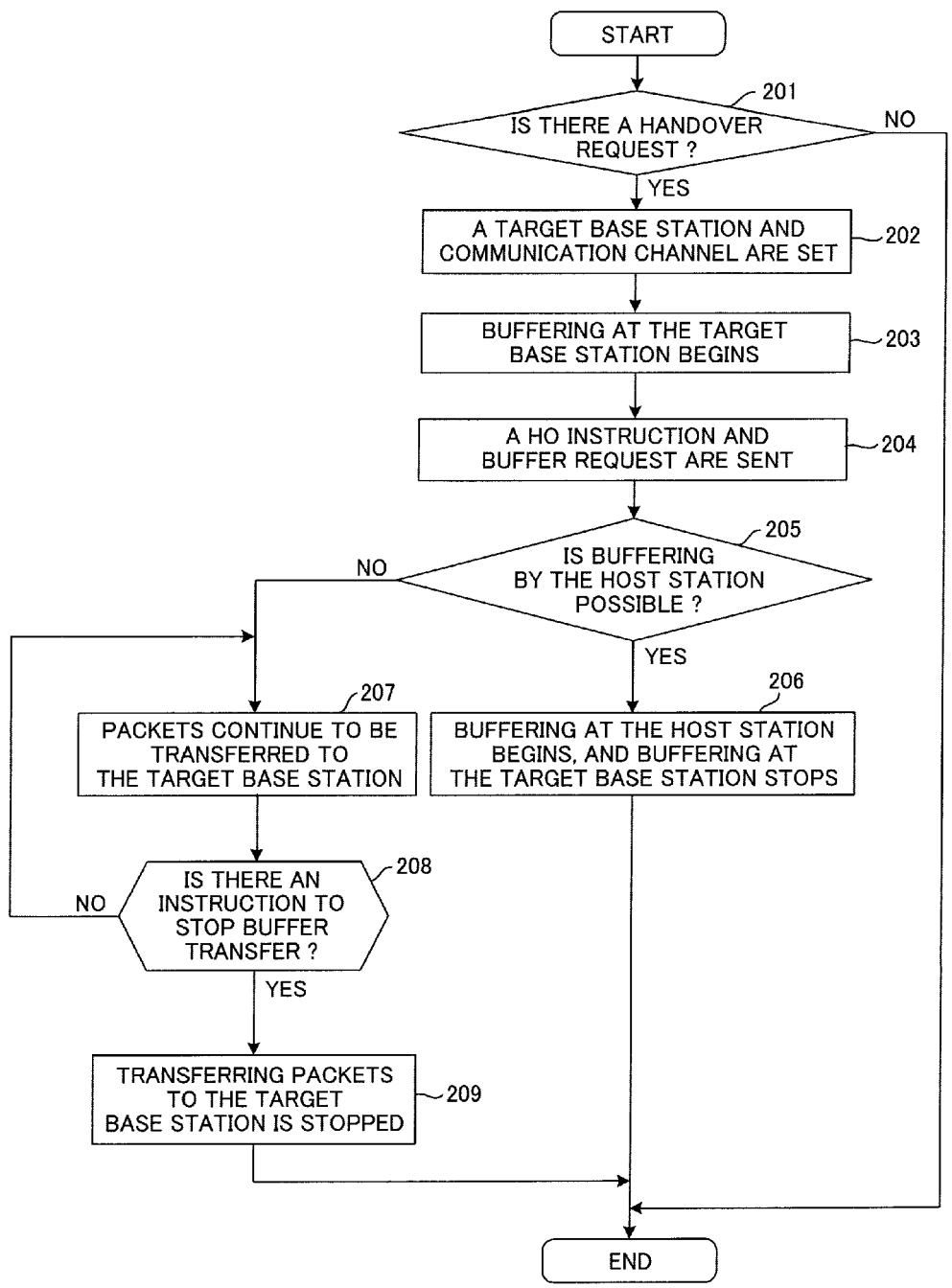
FIG. 10 is a flowchart showing the processing flow during handover control by the origin base station BS1 in a second embodiment of the present invention.
Figure 11:
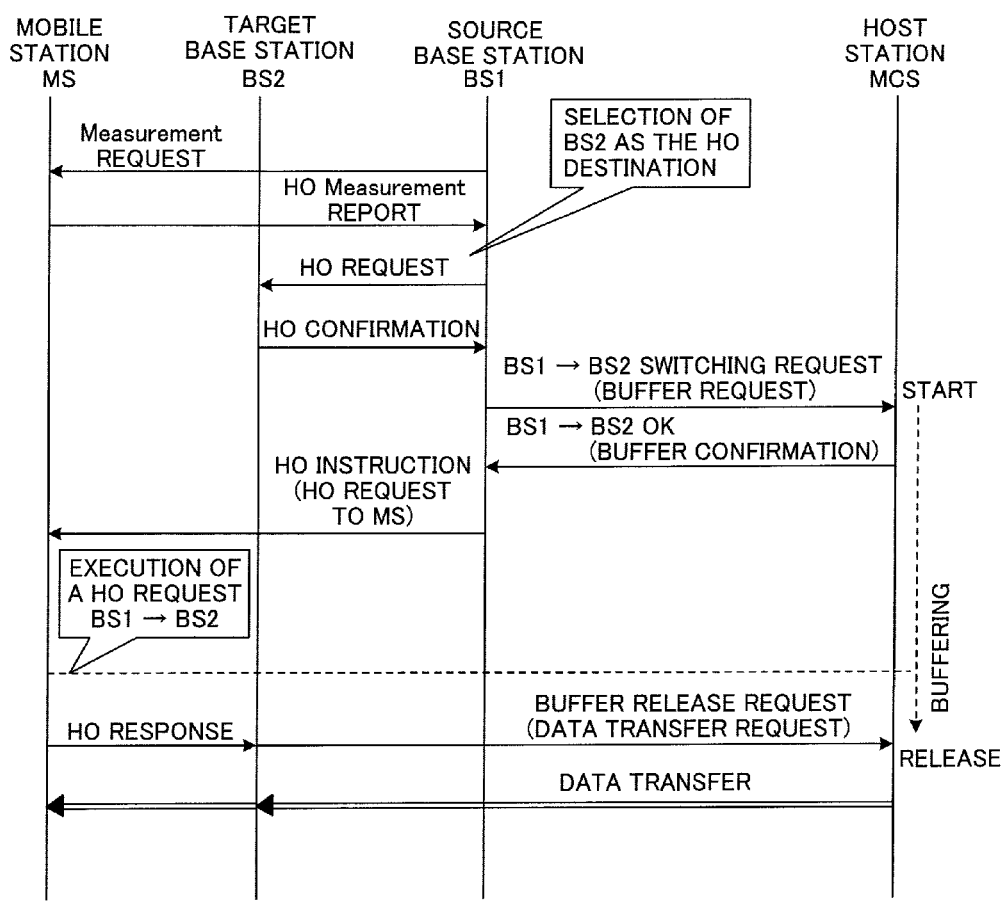
FIG. 11 is a drawing explaining a conventional handover control sequence.

FIG. 10 shows a flowchart of the processing flow during handover control by the origin base station BS1 in the second embodiment of the invention.

The origin base station BS1 references the signal levels from the base stations surrounding the mobile station to check whether handover is necessary (step 201), and when handover is not necessary ends processing and waits for the next judgment. On the other hand, when handover control is necessary, the origin base station BS1 references the reception levels from the surrounding base stations and sets a destination base station for handover, and sets a communication channel for communication with that destination base station BS2 (step 202). After setting a communication channel, the origin base station BS1 transfers packets for the mobile station to the destination base station BS2 to save in a buffer (step 203), and sends an instruction for handover to the mobile station, as well as sends a switching request to the host station MCS to switch the communicating base station (buffer request) (step 204).

When it is possible for the host station to save packets for the mobile station (step 205), or in other words, when it is possible to switch the communicating base station, the origin base station BS1 ends the transfer of packets for the mobile station to the destination base station BS2 (step 206).

However, when it is not possible in step 205 for the host station to save packets for the mobile station, the origin base station BS1 continues to transfer packets for the mobile station to the destination base station BS2, and the destination base station BS2 saves the packets in a buffer (step 207). After that, the origin base station BS1 waits for the timing for buffer transfer to stop (step 208). At the timing for buffer transfer to stop, the origin base station BS1 ends the transfer of packets for the mobile station to the destination base station BS2 (step 209).

In the second embodiment described above, during handover, the data packets for the mobile station are first saved by the handover destination base station, and then after that, the data packets for the mobile station are saved by the host station, so it is possible to give an instruction for handover to the mobile station even when there is no buffer confirmation response from the host station. More particularly, even though there is no buffer response from the host station, data packets for the mobile station continue to be saved by the handover destination base station, and when it becomes possible for the mobile station to communicate with the destination base station, that saved data can be sent to the mobile station, so it is possible to reduce the handover delay when there is no buffer confirmation response from the host station.

What is claimed is:

1. A handover control method for a mobile communication system having a plurality of base stations that communicate by way of radio communication with a mobile station, and a host station that controls the base stations and that switches the base station that communicates with the mobile station as the mobile station moves, comprising:

starting to save data packets for the mobile station during handover by an origin base station that has communicated with the mobile station up to that time, as well as instructing the mobile station to switch communication to a destination base station, and further sending a request to the host station to switch the base station that communicates with the mobile station from the origin base station to the destination base station, as well as requesting the host station to save the data packets for the mobile station;

when, in accordance with the switching request, it is possible for the host station to save the data packets, sending the origin base station information that shows that it is possible to switch the base station that communicates with the mobile station from the origin base station to the destination base station, as well as starting to save the data packets;

transferring the data packets that have been saved up to that time from the origin base station to the host station after determining that the host station can save data packets;

saving, by the host station, data packets for the mobile station, as well as saving data packets that are received from the origin base station; and sending the saved data packets from the host station to the mobile station via the destination base station when communication between the mobile station and the destination base station becomes possible.

2. The handover control method of claim 1, wherein the origin base station continues to save data packets for the mobile station when it is not possible for the host station to save the data packets; and the origin base station sends the saved data packets to the mobile station via the destination base station when communication between the mobile station and the destination base station becomes possible.

3. The handover control method of claim 1, wherein the base stations and the host station each have a buffer, and save data packets for the mobile station in those buffers.

4. A handover control method for a mobile communication system having a plurality of base stations that communicate by way of radio communication with a mobile station, and a host station that controls the base stations and that switches the base station that communicates with the mobile station as the mobile station moves, comprising:

starting to transfer data packets for the mobile station to a destination base station so that the destination base station saves the transferred data packets during handover by an origin base station that has communicated with the mobile station up to that time, as well as instructs the mobile station to switch communication to the destination base station, and further requesting the host station to switch the base station that communicates with the mobile station from the origin base station to the destination base station, as well as requesting the host station to save the data packets for the mobile station;

when in accordance to the switching request it is possible for the host station to save the data packets, sending the origin base station information that shows that it is possible to switch the base station that communicates with the mobile station from the origin base station to the destination base station, as well as the host station starting to save the data packets for the mobile station;

stopping transferring data packets from the origin base station to the destination base station after the origin base station determines that the host station can save the data packets; and when communication between the mobile station and the destination base station becomes possible, sending the saved data packets from the destination base station to the mobile station, and sending the saved data packets from the host station to the mobile station via the destination base station.

5. The handover control method of claim 4, wherein the origin base station continues to transfer data packets for the mobile station to the destination base station when it is not possible for the host station to save the data packets; and the destination base station saves the transferred data packets, and when communication between the mobile station and the destination base station becomes possible, sends the saved data packets to the mobile station.

6. A mobile communication system having a plurality of base stations which communicate by way of radio communication with a mobile station, and a host station that controls the base stations and switches a base station that communicates with the mobile station as the mobile station moves, wherein an origin base station that has communicated with a mobile station saves data packets for the mobile station, as well as instructs the mobile station to switch communication to a destination base station during handover, and further sends a request to the host station to switch the base station that communicates with the mobile station from the origin base station to the destination base station, as well as requests the host station to save the data packets for the mobile station;

when in accordance to the switching request it is possible for the host station to save the data packets, the host station sends the origin base station information that shows that it is possible to switch the base station that communicates with the mobile station from the origin base station to the destination base station, as well as starts to save the data packets;

the origin base station transfers the data packets that have been saved up to that time to the host station after determining that the host station can save data packets;

the host station saves data packets for the mobile station, as well as saves data packets that are received from the origin base station; and when communication between the mobile station and the destination base station becomes possible, the host station transfers the saved data packets to the destination base station and the destination base station sends the data packets received from the host station to the mobile station.

7. The mobile communication system of claim 6, wherein the origin base station continues to save data packets for the mobile station when it is not possible for the host station to save the data packets; and when communication between the mobile station and the destination base station becomes possible, the origin base station transfers the saved data packets to the destination base station and the destination base station sends the data packets received from the origin base station to the mobile station.

8. The mobile communication system of claim 6, wherein the base stations and the host station each have a buffer and save data packets for the mobile station in those buffers.

9. A mobile communication system having a plurality of base stations which communicate by way of radio communication with a mobile station, and a host station that controls the base stations and switches a base station that communicates with the mobile station as the mobile station moves, wherein during handover, an origin base station that has communicated with the mobile station up to that time, starts to transfer data packets for the mobile station to a destination base station so that the destination base station saves the transferred data packets, as well as instructs the mobile station to switch communication to the destination base station, and further requests the host station to switch the base station that communicates with the mobile station from the origin base station to the destination base station, as well as requests the host station to save the data packets for the mobile station;

when in accordance to the switching request it is possible for the host station to save the data packets, the host station sends the origin base station information that shows that it is possible to switch the base station that communicates with the mobile station from the origin base station to the destination base station, as well as starts to save the data packets, the origin base station stops transferring data packets to the destination base station after the origin base station determines that the host station can save the data packets; and when communication between the mobile station and the destination base station becomes possible, the destination base station sends the saved data packets to the mobile station, and the host station sends the saved data packets to the mobile station via the destination base station.

10. The mobile communication system of claim 9, wherein the origin base station continues to transfer data packets for the mobile station to the destination base station when it is not possible for the host station to save the data packets; and the destination base station saves the transferred data packets, and when communication between the mobile station and the destination base station becomes possible, sends the saved data packets to the mobile station.

* * * * *